US006957068B2

(12) United States Patent
Hutchison, IV et al.

(10) Patent No.: US 6,957,068 B2
(45) Date of Patent: Oct. 18, 2005

(54) SUBSCRIBER STATION WITH DYNAMIC MULTI-MODE SERVICE ACQUISITION CAPABILITY

(75) Inventors: James A. Hutchison, IV, San Diego, CA (US); Rotem Cooper, San Diego, CA (US); Paul T. Williamson, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 361 days.

(21) Appl. No.: 10/254,143

(22) Filed: Sep. 24, 2002

(65) Prior Publication Data

US 2003/0211862 A1 Nov. 13, 2003

Related U.S. Application Data

(60) Provisional application No. 60/380,406, filed on May 13, 2002, and provisional application No. 60/390,373, filed on Jun. 20, 2002.

(51) Int. Cl.[7] .................................................. H04Q 7/20
(52) U.S. Cl. ..................... 455/435.2; 455/436; 455/437; 455/438; 455/455; 455/552.2; 455/553.1; 370/331
(58) Field of Search ................................. 455/63.3, 434, 455/435.2, 436, 442, 455, 552.2, 553.1, 437, 438; 370/331, 319, 320, 321

(56) References Cited

U.S. PATENT DOCUMENTS

| | | | | |
|---|---|---|---|---|
| 5,020,093 | A | | 5/1991 | Pireh ............................ 379/59 |
| 6,119,003 | A | * | 9/2000 | Kukkohovi ............... 455/435.2 |
| 6,205,334 | B1 | * | 3/2001 | Dent ........................... 455/434 |
| 6,215,982 | B1 | * | 4/2001 | Trompower ................. 455/63.3 |
| 6,308,068 | B1 | * | 10/2001 | Kunkel ........................ 455/434 |
| 6,324,400 | B1 | * | 11/2001 | Shah et al. .................. 455/434 |
| 6,477,372 | B1 | * | 11/2002 | Otting et al. ................ 455/434 |

FOREIGN PATENT DOCUMENTS

| | | | | |
|---|---|---|---|---|
| EP | 0781064 A2 | | 6/1997 | ............ H04Q/7/32 |
| EP | 0781064 | * | 6/1997 | ............ H04Q/7/32 |
| WO | 9810617 | | 3/1998 | ............ H04Q/7/38 |
| WO | 9917475 | | 4/1999 | ........... H04B/17/00 |
| WO | 0162034 | | 8/2001 | ............ H04Q/7/38 |
| WO | 0237874 A1 | | 5/2002 | ............ H04Q/7/20 |

\* cited by examiner

*Primary Examiner*—Stephen M. D'Agosta
(74) *Attorney, Agent, or Firm*—Philip R. Wadsworth; Bruce W. Greenhaus; Thomas M. Thibault

(57) ABSTRACT

A system for providing a dynamic multi-mode service acquisition capability to a subscriber station is provided. The subscriber station is capable of operating in two or more modes of operation. A time to scan condition is indicated while the subscriber station is operating in a current mode of operation having active and inactive states. Responsive thereto, the system stores state information for the current mode of operation, and attempts at least a partial acquisition of communications services in accordance with another mode of operation. The at least partial acquisition attempt is scheduled to be initiated while the subscriber station is operating in the inactive state in the current mode of operation, and completed before the subscriber station transitions back to the active state in the current mode of operation. If the acquisition attempt is successful, the subscriber station transitions to the new mode of operation, maintaining appropriate registration. If unsuccessful, the subscriber station uses the stored state information to resume operating in the current mode of operation.

21 Claims, 6 Drawing Sheets

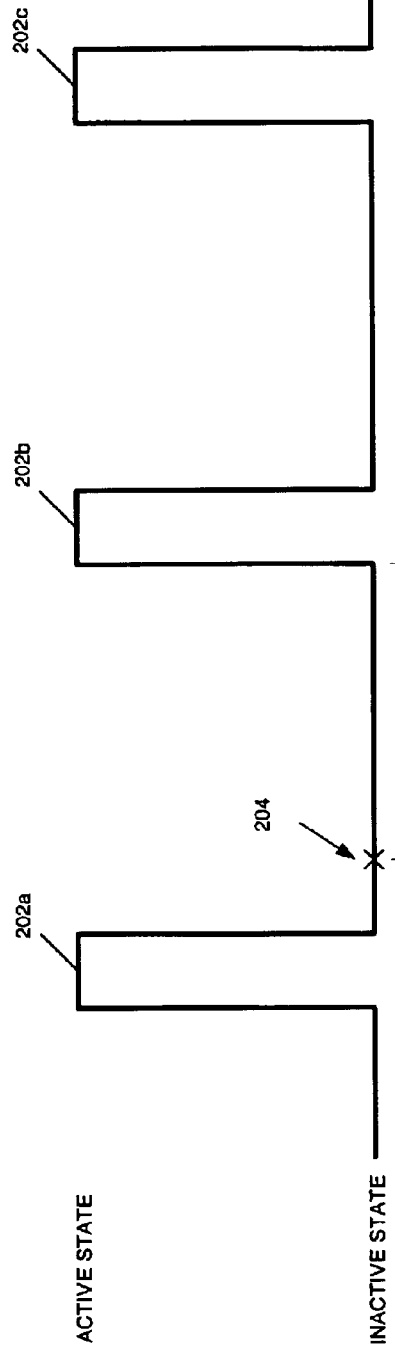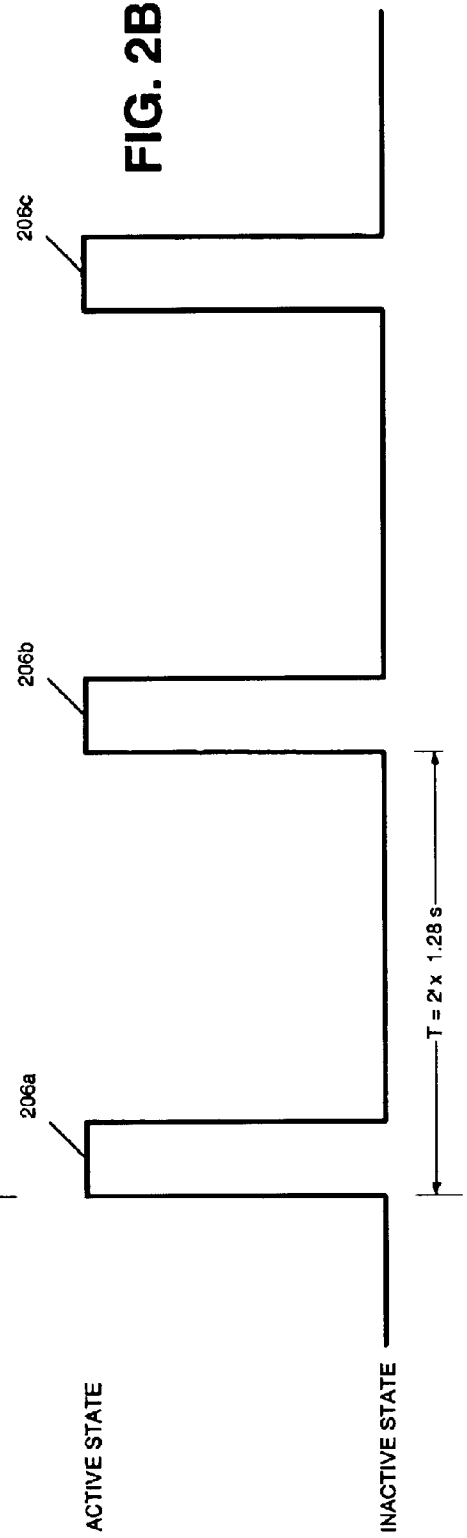

FIG. 5A

| System Record Field | Length (bits) |
|---|---|
| SID | 15 |
| NID_INCL | 1 |
| NID | 0 or 16 |
| NEG_PREF | 1 |
| GEO | 1 |
| PRI | 1 |
| ACQ_INDEX | 6 |
| ROAM_IND | 0 or 3 |

FIG. 5B

| Acquisition Record Field | Length (bits) |
|---|---|
| ACQ_TYPE (‛0010') | 4 |
| A_B | 2 |
| PRL_SEC | 2 |

FIG. 5C

| Acquisition Record Field | Length (bits) |
|---|---|
| ACQ_TYPE (‛0100') | 4 |
| NUM_BLOCKS | 3 |
| NUM_BLOCKS occurrences of the following field: | |
| BLOCK | 3 |

FIG. 5D

| Acquisition Record Field | Length (bits) |
|---|---|
| ACQ_TYPE (‛0101') | 4 |
| NUM_CHANS | 5 |
| NUM_CHANS occurrences of the following field: | |
| CHAN | 11 |

SUBSCRIBER STATION WITH DYNAMIC MULTI-MODE SERVICE ACQUISITION CAPABILITY

RELATED APPLICATIONS

This application claims priority to U.S. Provisional Application No. 60/380,406, filed on May 13, 2002, and also U.S. Provisional Application No. 60/390,373 filed on Jun. 20, 2002.

FIELD OF THE INVENTION

This invention relates to the fields of wireless communications, service acquisition and multi-mode subscriber stations, and, more specifically, to a dynamic multi-mode wireless communications service acquisition capability in a subscriber station.

RELATED ART

As wireless communications services have become prevalent throughout the world, a wide variety of diverse, multi-access modes or protocols have emerged for allowing multiple subscribers in a particular geographical area to access the limited frequency spectrum which is available at the same time. Examples of these modes or protocols include but are not limited to ANIPS, CDMA, GSM, and UMTS.

Wireless communications systems offering services compliant with different ones of these modes have emerged throughout the world. Many of these systems have disjoint coverage areas, and many have overlapping coverage areas. The cost and quality of the services offered by these systems may and often do differ. Consequently, a subscriber roaming into an overlapping coverage area could benefit by having access to the system in that coverage area which is best for that subscriber in terms of cost and quality, even if that system utilizes a different mode of operation than the mode with which the subscriber station is currently configured.

Typically, the subscriber station is either pre-configured with the mode utilized by the subscriber's home system, and cannot be dynamically reconfigured to handle other modes of operation, or if it can, can only be dynamically switched to a very limited number of other modes, e.g., CDMA vs. AMPS or WCDMA vs. GSM, and does not retain state information which allows a smooth return to the previous mode, i.e., a return without significant lapse in service, if the attempted switch is unsuccessful or if the previous mode is the preferred mode and services compliant with the previous mode later become available. In addition, active involvement by the subscriber may be required to switch into another mode. For example, a subscriber station is presently unavailable which is capable of dynamically switching between CDMA and GSM or WCDMA and CDMA modes of operation. The result is that many subscribers are unable to access the wireless communications services from a single subscriber station, which are best for that subscriber in terms of cost and/or quality.

Fully integrated networks provide indications to the subscriber station regarding neighboring systems and how to use them. For partially integrated networks, the network may transmit an indication of the presence of other types of systems a subscriber station is capable of using, but not necessarily where to find them or how to use them. Some systems are not integrated and provide no indication regarding the presence of other types of systems a subscriber station is capable of using. As a result of weak, or missing indications, and systems which provide no such indication, such as GSM or WCDMA not indicating the presence of CDMA, the multi-mode subscriber stations must occasionally leave the system being utilized to check for more desirable modes of service. This causes lapses in service while the subscriber station looks for the more desirable system, or systems. These lapses can result in missed calls, in direct proportion to the probability of a call during the lapse in service. When the more desirable system is not found, the subscriber station returns to the previous, less desirable, but available, system. The lapses in service are typically minimized by checking somewhat infrequently, for example every 3 minutes.

SUMMARY OF THE INVENTION

The invention provides a system for providing a dynamic multi-mode service acquisition capability in a subscriber station. The subscriber station is capable of operating in two or more modes of operation.

The system comprises first logic for indicating a time to scan condition while the subscriber station is operating in a current mode of operation having active and inactive states. In the active state, the receiver in the subscriber station is powered up so that the subscriber station can listen to a communications system. In the inactive state, in order to conserve power, the receiver of the subscriber station is powered down, and the subscriber station is incapable of listening to a communications system.

The system also comprises second logic, which, responsive to the first logic indicating a time to scan condition, retains state information for the current mode of operation, and attempts at least a partial acquisition of communications services in accordance with another mode of operation, the at least partial acquisition scheduled to be initiated while the subscriber station is in the inactive state in the current mode of operation and completed before the subscriber station transitions back to the active state in the current mode of operation.

If the at least partial acquisition attempt is successful, the system causes the subscriber station to cease operating in accordance with the current mode of operation, and to begin operating in accordance with the other mode of operation. If the at least partial acquisition attempt is unsuccessful, the system uses the retained state information to allow the subscriber station to resume operating in the current mode of operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2A is a timing diagram illustrating one example of transitions between active and inactive states in a subscriber station while operating in the GSM mode of operation.

FIG. 2B is a timing diagram illustrating one example of transitions between active and inactive states in a subscriber station while operating in the CDMA mode of operation.

FIG. 5A illustrates an example format of a system record in a preferred roaming list.

FIG. 5B illustrates an example format of an acquisition record for a CDMA system in a preferred roaming list.

FIGS. 5C–5D illustrate example formats of an acquisition record for a PCS CDMA system in a preferred roaming list.

DETAILED DESCRIPTION

As utilized herein, terms such as "about" and "substantially" are intended to allow some leeway in mathematical exactness to account for tolerances that are acceptable in the trade, e.g., any deviation upward or downward from the value modified by "about" or "substantially" by any value in the range(s) from 1% to 20% of such value.

Moreover, as used herein, the term "logic" refers to implementations embodied as hardware, software, or a combination of hardware and software. Furthermore, the term "memory" refers to any processor-readable medium, including but not limited to RAM, ROM, EPROM, PROM, EEPROM, disk, floppy disk, hard disk, CD-ROM, DVD, etc, on which may be stored a series of instructions executable by a processor.

The term "processor" refers to any device capable of performing functions responsive to executing a series of instructions and includes, without limitation, a general- or special-purpose microprocessor, finite state machine, controller or computer.

Figure 1:
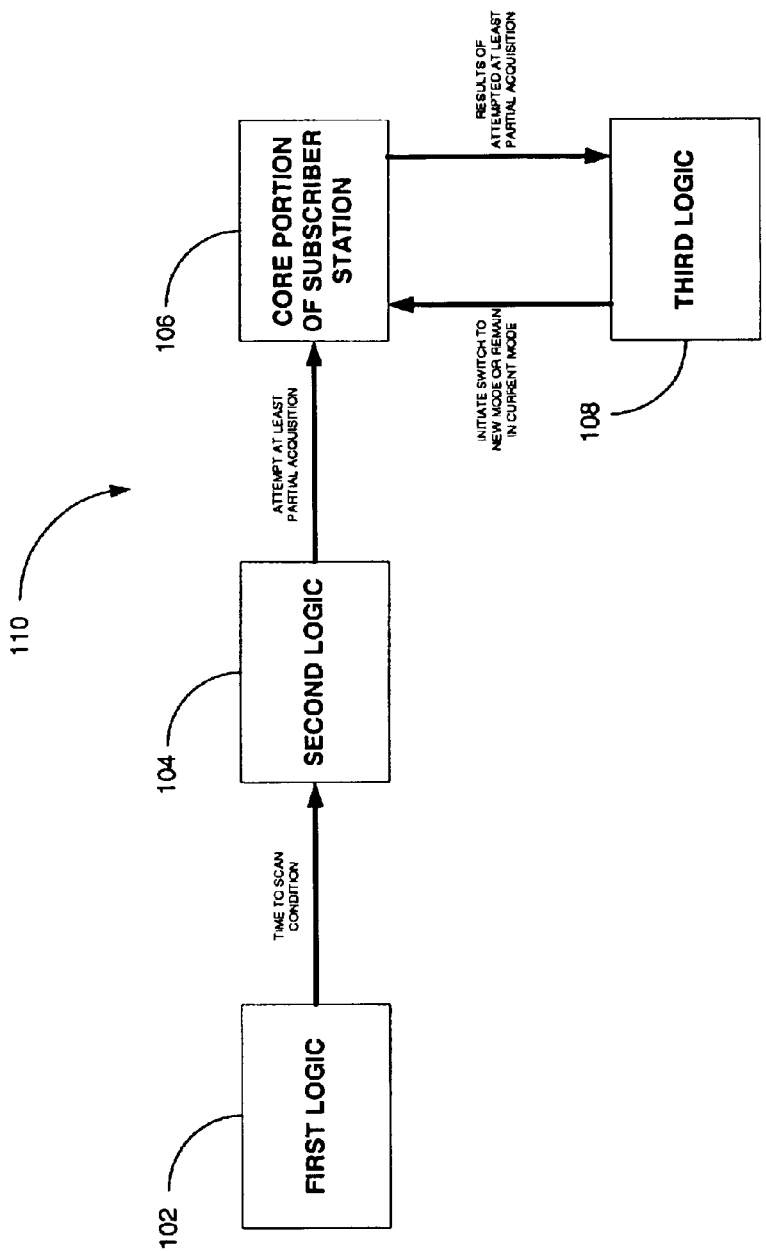
FIG. 1 is a simplified block diagram of an embodiment of a system according to the invention for providing a dynamic multi-mode service acquisition capability to a subscriber station.

Referring to FIG. 1, a first embodiment of a system 110 for providing a dynamic multi-mode service acquisition capability to a subscriber station 106 is illustrated. The subscriber station 106 is capable of operating in two or more modes of operation.

The system 110 comprises first logic 102 for indicating a time to scan condition while the subscriber station 106 is operating in a current mode of operation having active and inactive states. In the active state, the receiver in the subscriber station 106 is powered up so that the subscriber station is capable of listening to a communications system. In the inactive state, in order to conserve power, the receiver in the subscriber station 106 is powered down, and the subscriber station is not capable of listening to a communications system.

The system 110 also comprises second logic 104, which, responsive to the first logic 102 indicating a time to scan condition, retains state information for the current mode of operation. Generally speaking, the state information should be sufficient to allow a return to the current mode of operation without a significant lapse in service, and may comprise time or a time reference for the current mode, air interface protocol variables for the current mode, and/or hardware state necessary to restore operation in the current mode after visiting the other mode. The second logic 104 also attempts at least a partial acquisition of communications services in accordance with another mode of operation, the at least partial acquisition attempt scheduled to be initiated while the subscriber station 106 is in the inactive state in the current mode of operation and completed before the subscriber station 106 transitions back to the active state in the current mode of operation.

The system 110 also comprises third logic 108. If the at least partial acquisition attempt is successful, third logic 108 causes the subscriber station 106 to cease operating in accordance with the current mode of operation, and to begin operating in accordance with the other mode of operation. If the at least partial acquisition attempt is unsuccessful, third logic 108 uses the retained state information to allow the subscriber station 106 to resume operating in the current mode of operation.

In one implementation, the two or more modes comprise a first mode and a second mode, wherein the first mode is the GSM mode and the second mode is the CDMA mode. As is known, while in the GSM mode, a subscriber station periodically transitions back and forth between active and inactive states. For example, an idle subscriber station is typically assigned to a paging group, and pages to stations within that group are usually broadcast during pre-defined time slots within a 235.4 ms time period, which is the duration of a GSM control multi-frame. During this time slot, the subscriber station needs to turn its receiver on in case a page is directed to it. During the remainder of the duration of the control multi-frame, however, the subscriber station can turn its receiver off and thus enter the inactive state. The situation is illustrated in FIG. 2A, in which the time slots in which the subscriber station is active are identified with numerals 202a, 202b, 202c. As illustrated, these time slots are spaced from one another by the time period T of the control multi-frame, 235.4 ms.

In this implementation, the first logic 102 detects a time to scan condition while the subscriber station is operating in the GSM mode of operation. The indication of the time to scan condition may be triggered through a variety of mechanisms, including, for example, expiration of a timer, a determination that the signal strength of the system in use has fallen below a predetermined threshold and/or a determination that the signal strength of a candidate system exceeds a predetermined threshold or the signal strength of the system in use, or proximity of the subscriber station to the coverage area of a system employing the other mode of operation.

If it is desired to indicate a time to scan condition based on proximity detection, the subscriber station may be equipped with a GPS, AFLT, or hybrid receiver, and capable of determining its position (or arranging to have a position determination entity determine its position) from time of arrival measurements derived by the subscriber station from pilot signals transmitted from one or more reference sources with known locations visible to the subscriber station, including, without limitation, GSP satellites, base stations or sectors, or combinations of GPS satellites and base stations or sectors.

Various degrees of precision in the position estimate are also possible. If the precise position of the subscriber station is desired, four or more time of arrival measurements from four or more different reference sources may be required. However, if less precision is required, fewer than four measurements may be possible. For example, two measurements may be sufficient to determine the distance between the subscriber station and a base station or sector. That information, coupled with the known location of the base station or sector, may suffice for the proximity detection which is contemplated.

However the location of the subscriber station is determined, and whatever its precision, the subscriber station may then compare its location with the coverage area of the system employing the other mode of operation. To do so, the subscriber station may maintain and utilize a geography database indicating the coverage areas of possible systems which may be utilized by the subscriber station for acquiring communications services. If the two are sufficiently close, a time to scan condition may be triggered or indicated. Other examples are possible so nothing in the foregoing should be construed as limiting.

The occurrences of the time to scan condition should be spaced sufficiently to avoid undue power consumption by the subscriber station. More specifically, the attempted acquisition of communications services which is desired to be performed requires powering up the receiver of the subscriber station and re-entering the active state. If the spacing of these occurrences is too close, the ensuing searches will consume an excessive amount of power. In light of this concern, then, with reference to FIG. 2A, the occurrences of the time to scan condition should be spaced sufficiently to avoid this problem. For example, it is generally advisable to avoid indicating a time to scan condition every time the subscriber station transitions to the inactive state.

Second logic 104, responsive to the indication of the time to scan condition by the first logic 102, stores state information sufficient to allow a return to the GSM mode of operation without a significant lapse in service. Generally speaking, this state information includes timing information such as a GSM time reference. In addition, second logic 104 also determines the time until the subscriber station 106 is scheduled to transition back to the active state from the inactive state while in the GSM mode of operation. (It is assumed that the subscriber station 106 is in the inactive state when the second logic 104 makes this determination). Referring to FIG. 2A, for example, if the second logic 104 responds to the time to scan condition at time 204, it determines that the remaining time until the next scheduled transition back to the active state is X.

Responsive to the remaining time X, the second logic 104 then determines one or more search or acquisition parameters to govern the ensuing at least partial acquisition of CDMA services which is to be attempted. The one or more search or acquisition parameters are determined so that the at least partial acquisition of CDMA services which is to be attempted can be completed before the scheduled transition back to the active state in the GSM mode of operation. That is important to accomplish in this implementation because it allows the at least partial acquisition attempt to occur transparently in relation to the GSM mode of operation.

Full acquisition of CDMA services typically requires 5–30 seconds to accomplish. However, the period of time which is available until the subscriber station is scheduled to transition back to the active state while in the GSM mode of operation is typically on the order of hundreds of milliseconds. Consequently, generally speaking, there will be insufficient time to attempt a full acquisition of CDMA services in the time available, and only a partial acquisition is attempted.

As is known, in an IS-95A compliant system, system acquisition comprises two substates, a pilot channel acquisition substate, in which the subscriber station acquires a pilot channel in the CDMA system, followed by a sync channel acquisition substate, in which the subscriber station acquires a sync channel message. In one implementation example, the at least partial acquisition which is attempted comprises an abbreviated pilot acquisition process akin to what typically happens in the pilot acquisition substate. This process which will now be described.

According to this abbreviated process, the subscriber station first tunes to the pilot channel of the CDMA system, and then attempts to locate a pilot signal being transmitted by one of the base stations or sectors in the CDMA system. This is does by iteratively correlating a received signal with shifted versions of an identification code, where each shift of the identification code uniquely identifies a base station or sector in the CDMA system. For each shift in the code, the subscriber station determines the correlation between the shifted code and the received signal over an integration time I. It then successively repeats this process while varying the shift in the code. The resultant correlation values may be associated with the shift values to define a correlation function. If a peak of the resultant correlation function exceeds a predetermined threshold, a pilot signal corresponding to the shift in the identification code is considered to have been detected.

In one example, each sample of the received signal S is a complex number having in-phase (I) and quadrature (Q) components, and the signal S may include one or more pilot signals each modulated with a shifted version of a PN code which uniquely identifies the pilot signal (and the base station or sector from which the pilot signal originates). In one implementation, a correlator in the subscriber station first determines a correlation value C, which depends on the shift s in the PN code which is used. This correlation value may be coherent, i.e., retains phase information. In this case, the correlation value is a complex number which can be expressed as follows:

$$C(PN, s) = \sum_{i=k+0}^{k+N-1} PN(i-s) \cdot S(i) \quad (1)$$

where N is the (coherent) integration time in terms of chips, S(i) are samples of the received signal, and k is an arbitrary start time. In this implementation, the integration time I is the coherent integration time N.

In a second implementation, the correlator determines a correlation value C, which is a real number and is derived by non-coherently, i.e., not retaining phase information, combining M successive coherent integrations, each conducted over N chips. In this implementation, the correlation value C may be expressed as follows:

$$C(PN, s) = \sum_{j=1}^{M} \sum_{i=k+(j-1)N}^{k+jN-1} |PN(i-s) \cdot S(i)| \quad (2)$$

In this implementation, the integration time I is the product of N and M.

The range of the shift s that is tested is the search window W. The W values C(PN, s) which result together form a correlation function F(PN, s), which represents the degree of correlation between the signal S and the shift s of the PN code (where the shift s is expressed in terms of chips) over a desired search window W. In the case where the PN code is repeatedly modulated onto the received signal, the correlation function F(PN, s) will be periodic.

Figure 3:
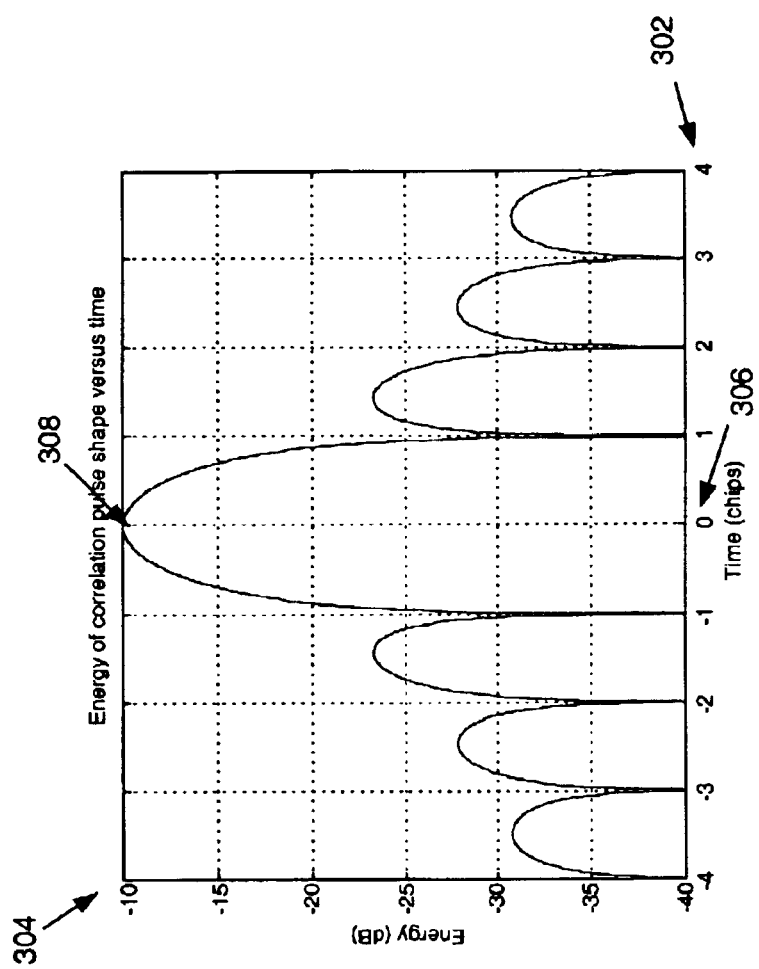
FIG. 3 illustrates an example of correlation function derived from a pilot signal is a CDMA system.

FIG. 3 illustrates an example of a correlation function F(PN, s) for a pilot signal in a CDMA wireless communication system. The window size (in terms of chips) in this example is 8, and the window is assumed to be centered at the origin 306. The horizontal axis 302 represents the shift of the PN code (expressed in terms of chips), and the vertical axis 304 represents the correlation function F(PN, s) (expressed in terms of Energy(dB)). As illustrated, the peak 308 of the function in this example is located at the origin 306.

If the peak 308 of the correlation function is sufficiently high and sufficiently distinguishable from noise and other distortions (such as multi-path or lack of line of sight) that the risk of a false positive is reduced to an acceptable level, then a successful measurement has been obtained.

From the foregoing, it can be seen that several of the parameters used in this process, W, the window size, N, the coherent integration time, and M, the non-coherent integration time, are variables which impact the time it takes for the at least partial acquisition process to occur. In other words, the larger the window size W, the larger the coherent integration time N, and the larger the non-coherent integration time M, generally speaking, the longer the at least partial acquisition process will take. Consequently, in this implementation, second logic 104 will set these parameters so that the attempted acquisition process will occur within the time available until the subscriber station returns to the active state in the GSM mode of operation.

In one implementation, the energy level of the peak of the correlation function is provided to third logic 108, which determines from this information whether the acquisition attempt was successful. As previously discussed, in one implementation, the acquisition attempt is deemed to be successful if the energy level of the peak of the correlation function exceeds a predetermined level. A faster, but less reliable implementation would be to deem the acquisition attempt successful if the uncorrelated energy level (RSSI) exceeds a predetermined level. These techniques can be combined, or selected, based on desired reliability and available time to attempt the acquisition.

If the acquisition attempt is successful, the third logic 108 in this implementation causes the subscriber station to cease operating in the GSM mode of operation, to complete acquisition of services from the CDMA system, and begin operating in the CDMA mode of operation.

In one configuration, this is accomplished by causing the subscriber station to de-register from the GSM system, and complete acquisition of services on the CDMA system (which may include the step of acquiring a synch channel message from the sync channel of the CDMA system to obtain the SID of the CDMA system, and other information necessary to acquire system timing), to synchronize itself with the CDMA system, and to register itself with the CDMA system if directed by the CDMA system information. In this configuration, it is considered important for the subscriber station to de-register from the GSM system before registering with the CDMA system to avoid confusing the two systems or triggering one system to falsely detect a fraud situation.

In another configuration, if the acquisition attempt is successful, the third logic 108 causes the subscriber station to initiate hard or soft handoff procedures for the purpose of transitioning to the CDMA mode of operation. In this configuration, it may be possible for the subscriber station to be jointly registered with both the GSM and CDMA systems while the handoff is occurring.

It is also possible for the subscriber station to dynamically switch from the CDMA to the GSM mode operation in like manner to that employed in dynamically switching from the GSM to the CDMA mode of operation. In particular, in the CDMA mode of operation, a slotted paging scheme may be employed, whereby the subscriber station need only monitor a paging channel for paging messages for an interval every paging cycle. The duration of the paging cycle is a system parameter which may typically range from 1.28 to 163.84 seconds, and which may be expressed as $2^i \times 1.28$ seconds, where the index i ranges from 0 to 7. This index i is referred to as the slot cycle index. CDMA systems utilizing the Quick Paging Channel have slot activity indications as an optimization to indicate whether or not the subscriber station should listen for messages in the next interval. The Quick Paging Channel provides a periodic indication that includes similar inactive periods.

The subscriber station need only listen to paging messages during an interval within the paging cycle. In the remaining portion of the paging cycle, the subscriber station may power down its receiver and enter the inactive state. The situation is illustrated in FIG. 2B, which illustrates the time periods 206a, 206b, 206c during which the subscriber station is maintained in the active state. During the remaining portion of the paging cycle T, the receiver in the subscriber station may be powered down, and the subscriber station placed in the inactive state.

Upon or after a time to scan condition is indicated, second logic 104, while the subscribe station is in the inactive state, may again store state information sufficient to allow the subscriber station to return to the CDMA mode of operation without a significant lapse in service, and also determine the remaining time until the subscriber station is scheduled to transition back to the active state, and, responsive thereto, determine the parameters of an acquisition attempt so that the attempt is scheduled to be completed before this transition. Once these parameters have been determined, the second logic 104 may then initiate the acquisition attempt.

Here, however, in contrast to the transition from the GSM mode of operation, there may be sufficient time to complete the acquisition of GSM services since the paging cycle, and hence the available time for the acquisition attempt, may be up to 163.84 seconds in duration, which is greater than the typical time required to acquire GSM services. Therefore, it may be possible to attempt a full acquisition of GSM services when transitioning out of the CDMA mode of operation.

Some of the tasks that may be performed during the acquisition attempt include using the frequency correction channel (FSSH) to synchronize the local oscillator of the subscriber station with the frequency reference of a base transceiver in the GSM system, gaining timing information from the synchronization channel (SCH) and synchronizing the subscriber station to the GSM frame and multi-frame timing structure, and obtaining other important system information broadcast by the base station transceiver over the broadcast control channel (BCCH).

If the acquisition attempt is successful, as before, the third logic 108 causes the subscriber station to cease operating in the CDMA mode of operation and begin operating in the GSM mode of operation. In one configuration, these tasks are performed by de-registering from the CDMA system, completing acquisition, if necessary, of services from the GSM system, and registering with the GSM system. In another configuration, these tasks are performed by initiating hard or soft handoff procedures from the CDMA to the GSM system.

Figure 4:
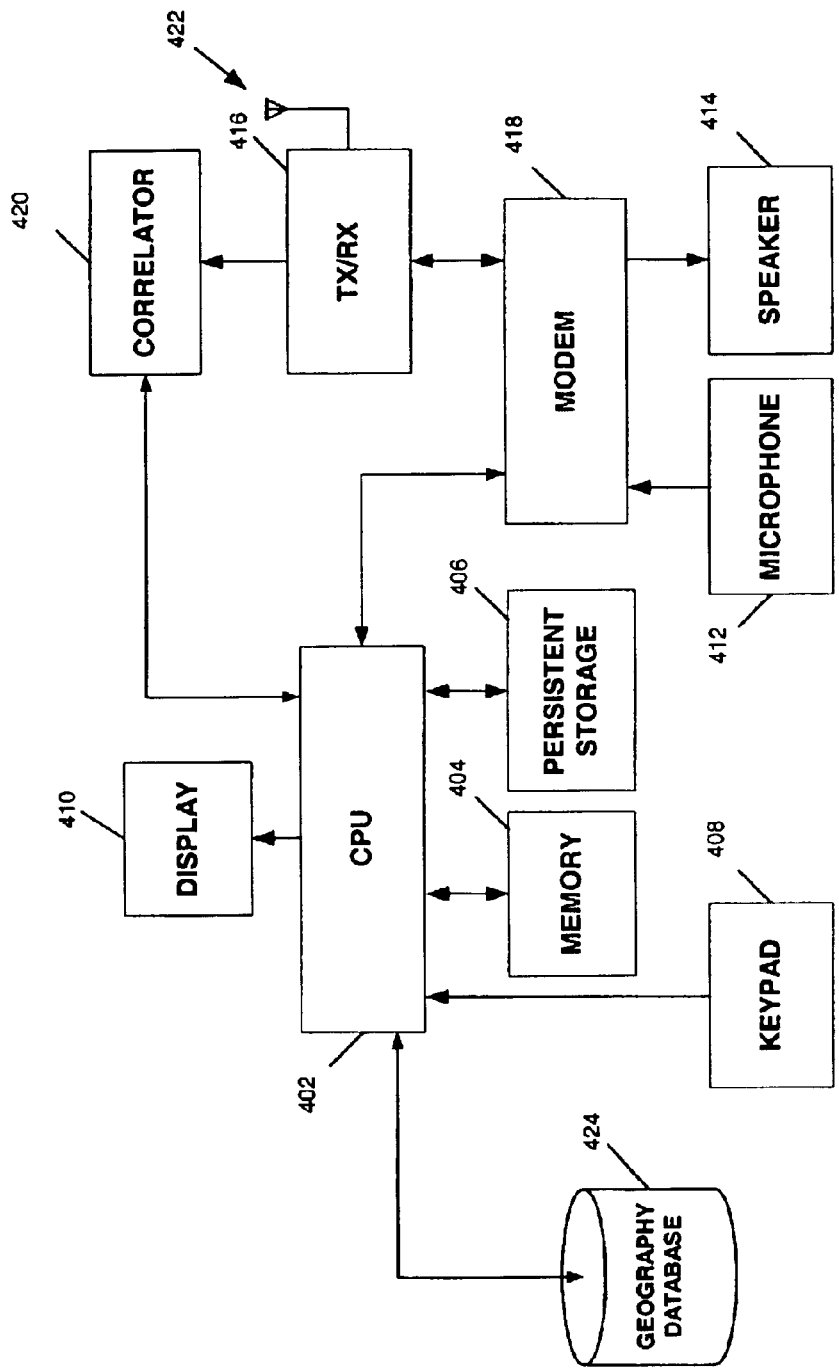
FIG. 4 is a simplified block diagram on one implementation of a system according to the invention for providing a dynamic multi-mode service acquisition capability to a subscriber station.

An implementation example of a multi-mode wireless communications device which embodies a system according to the invention is illustrated in FIG. 4. In this particular example, the components of the wireless communications device comprise CPU 402 for executing software instructions; memory 404 to hold software instructions and data; persistent storage 406; keypad 408 and display 410, which are both typically provided as part of a user interface; a microphone 412 and speaker 414 typically provided to support use of the device for transceiving voice; a radio transceiver (Tx/Rx) 416 capable of receiving and transmitting information over a wireless communications link in multiple modes; modem 418 for modulating baseband information, such as voice or data, onto an RF carrier, and demodulating a modulated RF carrier to obtain baseband information; and an antenna 422 for transmitting a modulated RF carrier over a wireless communications link and receiving a modulated RF carrier over a wireless communications link. These components are standard items in many wireless communications devices, and need not be explained further.

In this particular implementation example, the wireless communications device is capable of switching between first and second modes of operation, which are different modes, each selected from the group comprising 1x, 1xEV, AMPS, CDMA, GSM, TDMA, and WCDMA.

Figure 6:
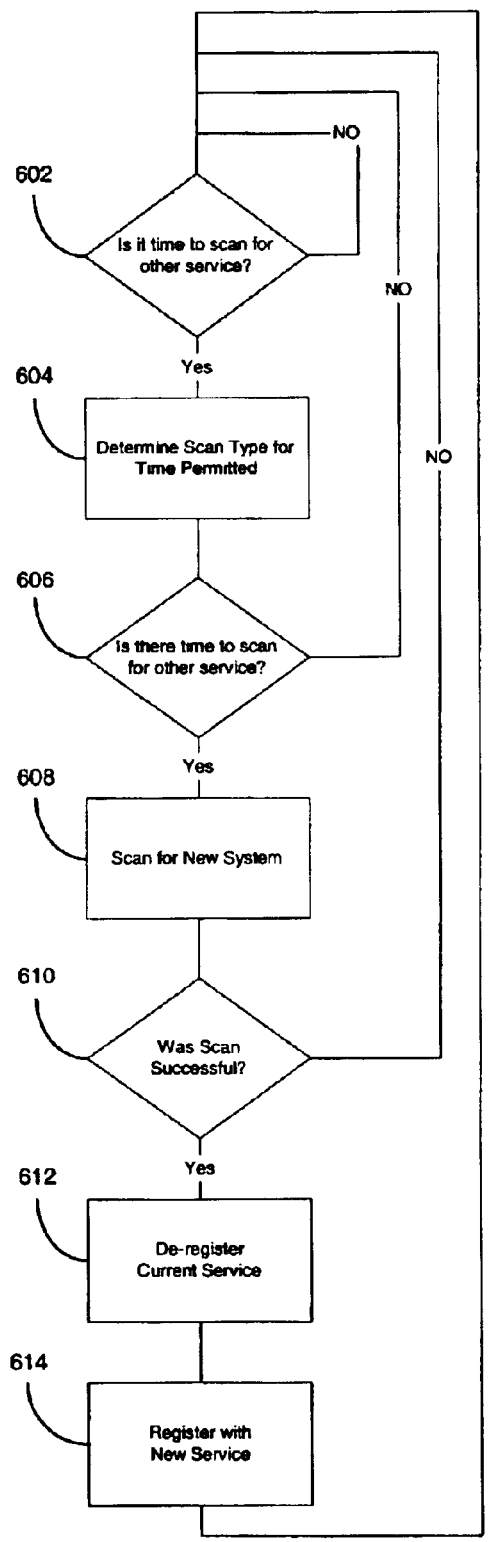
FIG. 6 is a simplified flowchart illustrating an embodiment of a method according to the invention of dynamically acquiring services in a subscriber station.

Moreover, in this particular implementation example, the functions of the first, second, and third logic 102, 104, 106 described earlier and to be discussed later on in relation to FIG. 6 are implemented in software executable by the CPU 402 in FIG. 4. This software may be embodied in the form of a series of instructions stored in memory 404, persistent storage 406, or both.

The persistent storage 406 is configured to hold provisioning information useful for acquiring wireless communications services in multiple modes, and can be implemented as a combination of devices such as a non-volatile EEPROM combined with a SIM card.

In one example, the provisioning information comprises a Preferred Roaming List (PRL), a CDMA construct which comprises a list of System ID, Network ID (SID, NID) pairs identifying CDMA systems and networks within CDMA systems, and for each SID, NID pair, a geographical indicator indicating the coverage area of the system or network specified by the SID, NID pair, an indicator of the preference to be given to the system or network specified by the SID, NID pair in relation to the other systems or networks in the list or an indicator that the system or network specified by the SID, NID pair is not preferred, and the frequencies or channels to be utilized in attempting acquisition of services from the system or network specified by the SID, NID pair. The provisioning information may also comprise a Most Recently Used (MRU) list, a list of SID, NID pairs specifying the most recently used systems or networks by the subscriber.

In another example, the Preferred Roaming List (PRL) also includes records which use the 1xEV Subnet ID as well as, or in place of, System ID, Network ID (SID, NID) pairs, identifying CDMA systems and networks within CDMA systems. The provisioning information may also comprise a Most Recently Used (MRU) list, a list of Subnet IDs as well as, or in place of, SID, NID pairs specifying the most recently used systems or networks by the subscriber. Alternately, MRU entries for Subnet IDs and SID, NID pairs could be separated into two lists, one for each mode.

In yet another example, the Preferred Roaming List (PRL) also includes records which use the PLMN or PLMN+LAC grouping (both described below) as well as, or in place of, 1xEV Subnet IDs or System ID, Network ID (SID, NID) pairs, for identifying GSM systems and networks within GSM systems. The provisioning information may also comprise a Most Recently Used (MRU) list, as noted above.

In addition, the provisioning information may also include a Public Land Mobile Network (PLMN) List, a GSM construct which comprises a list of PLMNs i.e., Mobile Country Code, Mobile Network Code (MCC, MNC) pairs identifying countries and GSM networks within countries, and for each MCC, MNC pair, a geographical indicator indicating the coverage area of the system or network specified by the MCC, MNC pair, an indicator of the preference to be given to the system or network specified by the MCC, MNC pair in relation to the other systems or networks in the list or an indicator that the system or network specified by the MCC, MNC pair is not preferred, and the frequencies or channels to be utilized in attempting acquisition of services from the system or network specified by the pairs. The MCC, MNC pair may be associated with one or more Location Area Code (LAC) values to further specify regions of a system or network.

This provisioning information may be used by the protocol stack executing on the CPU 402 to dynamically determine a candidate system or network for acquisition which is preferred by the subscriber compared to the current system or network, and at least some of the acquisition parameters to be employed in conducting the attempted acquisition of services from the candidate system or network. When a time to scan condition is detected, the protocol stack maintaining communication with the current system or network may be suspended, and another protocol stack may be called up to perform an attempted acquisition of services from the other network or system. As discussed, the search/acquisition parameters to be employed in the acquisition attempt are determined so that the attempt will be completed before the next scheduled transition to the active state in the previous mode of operation. That will allow the attempted acquisition to be transparent to the previous protocol stack.

In one implementation, the Preferring Roaming List comprises an ordered list of System Records, each having the format illustrated in FIG. 5A. In this record, the SID field is a 15-bit system identifier of the system associated with the record, and the value '000000000000000' matches any SID and thus serves as a SID wildcard.

The NID_INCL field is a 1-bit field indicating whether or not the system record includes a NID field. If the field is set to '1', the record includes a NID field; otherwise, this field is set to '0'.

The NID field, if present as indicated by the NID_INCL field, is a 16-bit field identifying the network associated with the record. The value '1111111111111111' matches any NID and thus serves as a NID wildcard.

The NEG_PREF field is a 1-bit field, and indicates whether or not the subscriber station is allowed to operate with the system or network associated with the record. The field is set to a '1' is the subscriber station is allowed to operate in the system or network associated with the record, and is set to a '0' otherwise.

The GEO field is a 1-bit geographical region indicator. If the record is the first one in the list, the field is set to '0'. If the record is not the first one in the list, and the system or network associated with the record is in the same geographical region as the system or network associated with the previous record, this field is set to the same value as the GEO field of the previous record. Otherwise, this field is set to the complement of the value of the GEO field of the previous record.

The PRI field is a 1-bit relative priority indicator. If the record is the first one in the list, this field is set to '0'. If the record is not the first one in the list, and the value of the GEO field of this record is different from that of the previous record, this field is set to '0'. If the record is not the first one in the list, and the value of the GEO field of this record is the same as that of the previous record, and the system or network associated with this record is as desirable as the system or network associated with the previous record, this field is set to the PRI field of the previous record; otherwise, it is set to the complement of the PRI field of the previous record.

The ACQ_INDEX field is a 6-bit index of the acquisition record that specifies the acquisition parameters for the system or network associated with the record. The format of these acquisition records will be discussed later.

The ROAM_IND field is only present if the NEG_PREF field is set to '1'. This field, if present, is a 3-bit field which is set to the roaming indication value for the system or network associated with the record. If the field is set to '000', it indicates that the subscriber station is not roaming and that the roaming indicator is off. If the field is set to '001', it indicates the roaming indicator of the subscriber station is on. If the field is set to '010', it indicates that the roaming indicator is flashing.

Some examples of the possible formats of the acquisition records are illustrated in FIGS. 5B–5D. FIG. 5B illustrates the format of the acquisition record for a cellular CDMA system or network. The ACQ_TYPE field is a 4-bit field which indicates the acquisition record type. In this case, the record type is set to '0010', which indicates cellular CDMA.

The A_B field is a 2-bit field, which indicates whether the system or network associated with the record is assigned to the A-band or the B-band. The value '00' specifies the A band; the value '01' specifies the B band; and the value '11' specifies either the A- or B-band.

The PRI_SEC field is a 2-bit field indicating whether the primary or secondary channel is preferred. The primary channel in the A-band is 283 and the secondary channel in the A-band is 691. The primary channel in the B-band is 384 and the secondary channel in the B-band is 777. The value '00' indicates that the primary channel is preferred; the value '01' indicates that the secondary channel is preferred; and the value '11' indicates that either the primary or secondary channel is preferred.

FIG. 5C illustrates the format of an acquisition record for a PCS CDMA system or network, in which the record specifies one or more frequency blocks.

The ACQ_TYPE field is a 4-bit field which again specifies the acquisition record type. In this case, the field has a value of '0100', which indicates a PCS CDMA acquisition record in terms of frequency blocks.

The NUM_BLOCKS field is a 3-bit field which specifies the number of PCS frequency blocks included in the acquisition record.

The BLOCK field is a 3-bit field which specifies a PCS frequency block. This field may be replicated, and the number of occurrences of this field is given by the value of the NUM_BLOCKS field. A value of '000' specifies the A block; a value of '001' specifies the B block; a value of '010' specifies the C block; a value of '011' specifies the D block; a value of '100' specifies the E block; a value of '101' specifies the F block; and a value of '111' indicates any block.

FIG. 5D illustrates the format of an acquisition record for a PCS CDMA system or network which specifies one or more CDMA channels.

The ACQ_TYPE field is set to a value of '0101', indicating a PCS CDMA acquisition record in terms of channels.

The NUM_CHANS field is a 5-bit field indicating the number of CDMA channels included in this record.

The CHAN field is an 11-bit field indicating a PCS CDMA channel number. This field may be replicated, and the number of occurrences of this field is given by the value of the NUM_CHANS field.

The MRU list and PLMN lists may have similar formats to the foregoing. Moreover, in the case where the current system spans multiple geographical regions, it may be desirable to employ an alternative to the foregoing known as an Alternate Scan List (ASL), which is derived from the PRL, and comprises the union of the records associated with the more preferred systems or networks in all the geographical regions spanned by the current system.

Turning back to FIG. 4, the (optional) geography database 424 is a database indicating the coverage areas of the systems or networks specified in one or more of the Preferred Roaming List, the MRU List, and the PLMN List. This information may be used to detect proximity of the subscriber station to the coverage area of one of these systems or network, which, in turn, may trigger a time to scan condition. This database may be implemented in the form of the previously discussed provisioning information, in which geographical indicators of the coverage areas of systems or networks corresponding to SID, NID pairs, MCC, MNC pairs or MCC, MNC, LAC groups are provided. Alternately, the geography database 424 may be embodied as a separate database from this provisioning information. However implemented, the geography database 424 should indicate the coverage areas of systems or networks which are accessible by the subscriber station for the acquisition of communications services.

Correlator 420 is provided for acquiring CDMA systems among other functions. For a given PN code shift, it produces a correlation function within a defined search window W in accordance with defined coherent and non-coherent integration times (N, M).

Referring to FIG. 6, an embodiment of a method according to the invention of dynamically acquiring communication services in a subscriber station is illustrated. This method may be tangibly embodied as a series of instructions stored in a memory, such as but not limited to memory 404 and/or persistent storage 406 in the subscriber station of FIG. 4.

The method begins with step 602, which comprises determining whether it is time to scan for another service. (In one embodiment, this step is performed while the subscriber station is in a current mode of operation). If so, control passes to step 604. If not, the method loops back to the beginning of step 602.

Step 602 may be performed in a variety of ways. In one implementation, it is performed upon expiration of a timer, which times the spacing between the time to scan occurrences sufficiently so that the attempted acquisition of new services does not unduly drain battery life. In another implementation, this step comprises determining whether the signal strength from a candidate system is above a predetermined threshold and/or whether the signal strength from the system in use has fallen below a predetermined threshold and/or whether the signal strength from the candidate system is sufficiently above that of the system in use. In yet a third implementation, this step comprises determining whether there is sufficient proximity between the location of the subscriber station and the coverage area of the candidate system to warrant a scan for new services.

In step 604, the method determines a candidate system or network, and the scan type which is possible given the time permitted before the subscriber station is scheduled to transition back to the active state while in the current mode of operation. (In one embodiment, this step is assumed to occur while the subscriber station is in the inactive state in the current mode of operation). In one implementation, the candidate system or network is determined based on provisioning information which reflects the subscriber's preferences. In one example, if the new system is expected to be a CDMA system, this step comprises setting the search window W, as well as the coherent and non-coherent integration times N, M, so that there is sufficient time to perform the acquisition in the time permitted.

From step 604, control passes to optional step 606, which checks whether there is sufficient time to perform the scan before the subscriber station is scheduled to transition back into the active state while in the current mode of operation. This step is optional as it is at least partly redundant to step 604, which sets the searching parameters so that the scan will be completed in the time permitted. If performed, this step may comprise confirming that it is possible to the scan in the time permitted. If so, control passes to step 608. If not, control loops back to the beginning of step 602.

In step 608, timing and state information for the current mode of operation is stored, and the scan determined in step 604 is performed. The timing and state information which is stored should be sufficient to allow a later return to the current mode of operation without a significant lapse in service. In one example, this step is performed at least in part based on provisioning information specifying preferred frequencies or channels for the acquisition attempt. Step 610 follows. In step 610, an inquiry is made whether the scan was successful. If so, control passes to step 612. If not, control loops back to the beginning of step 602.

In step 612, the subscriber station de-registers from the current service. Step 614 follows step 612. In step 614, the subscriber station completes, if necessary, acquisition of services from the new system, and also registers with the new system. Control then passes to the beginning of step 602.

In another embodiment, in lieu of steps 612 and 614, the method performs a soft or hard handoff from the current to the new system. Note that in this embodiment, it is possible, but not necessary, for the subscriber station to be registered with both systems simultaneously.

While various embodiments of the invention have been described, it will be apparent to those of ordinary skill in the art that many more embodiments and implementations are possible that are within the scope of this invention.

What is claimed is:

1. A system for providing a dynamic multi-mode service acquisition capability to a subscriber station, the subscriber station capable of operating in two or more modes of operation, the system comprising:

first logic for indicating a time to scan condition while the subscriber station is operating in a current mode of operation having active and inactive states, the time to scan condition is indicated responsive to sufficient proximity being detected between the subscriber station and coverage area of a candidate system, wherein the proximity detection is accomplished based on consideration of an estimated location of the subscriber station in relation to the coverage area of the candidate system;

second logic for, responsive to the first logic, indicating a time to scan condition storing state information for the current mode of operation and attempting at least a partial acquisition of communications services from a candidate system in accordance with another mode of operation, the at least partial acquisition attempt initiated while the subscriber station is in the inactive state in the current mode of operation and scheduled to be accomplished before the subscriber station transitions back to the active state in the current mode of operation; and third logic for, if the at least partial acquisition attempt is successful, causing the subscriber station to cease operating in accordance with the current mode of operation and begin operating in accordance with the other mode of operation, and for, if the at least partial acquisition attempt is unsuccessful, allowing the subscriber station to use the stored state information to resume operating in the current mode of operation.

2. The system of claim 1 wherein the estimated location of the subscriber station is determined based on signals received from one or more reference sources.

3. The system of claim 1 wherein at least one of the reference sources comprises a GPS satellite.

4. The system of claim 1 wherein at least one of the reference sources is a base station or sector.

5. The system of claim 1 wherein at least one of the reference sources is a GSP satellite and another is a base station or sector.

6. A system for providing a dynamic multi-mode service acquisition capability to a subscriber station, the subscriber station capable of operating in two or more modes of operation, the system comprising:

first logic for indicating a time to scan condition while the subscriber station is operating in a current mode of operation having active and inactive states;

second logic for, responsive to the first logic indicating a time to scan condition, storing state information for the current mode of operation and attempting at least a partial acquisition of communications services in accordance with another mode of operation, the at least partial acquisition attempt initiated while the subscriber station is in the inactive state in the current mode of operation and scheduled to be accomplished before the subscriber station transitions back to the active state in the current mode of operation, wherein the second logic determines when the subscriber station is scheduled to next transition to the active state in the current mode of operation, and, responsive thereto, determines one or more parameters of the at least partial acquisition; and third logic for, if the at least partial acquisition attempt is successful, causing the subscriber station to cease operating in accordance with the current mode of operation and begin operating in accordance with the other mode of operation and for, if the at least partial acquisition attempt is unsuccessful, allowing the subscriber station to use the stored state information to resume operating in the current mode of operation.

7. The system of claim 6 wherein the one or more parameters comprise coherent integration time.

8. The system of claim 6 wherein the one or more parameters comprise incoherent integration times.

9. The system of claim 6 wherein the one or more parameters comprise coherent and incoherent integration times.

10. The system of claim 6 wherein the one or more parameters comprise one or more energy levels.

11. A method of dynamically acquiring services in a subscriber station, the subscriber station capable of operating in two or more modes of operation, the method comprising:

indicating a time to scan condition while the subscriber station is operating in a current mode of operation having active and inactive states, wherein the time to scan condition is indicated responsive to sufficient proximity being detected between the subscriber station and a coverage area of a candidate system, and wherein the proximity detection is accomplished based on consideration of an estimated location of the subscriber station cell in relation to the coverage area of the candidate system;

storing, responsive to the indication of the time to scan condition, state information for the current mode of operation;

attempting responsive to the indication of the time to scan condition, at least a partial acquisition of communications services in accordance with the other mode of operation, the at least partial acquisition attempt scheduled to be initiated while the subscriber station is in the inactive state in the current mode of operation and completed before the subscriber station transitions back to the active state in the current mode of operation;

causing, if the at least partial acquisition attempt is successful, the subscriber station to cease operating in accordance with the current mode of operation and begin operating in accordance with the other mode of operation; and allowing, if the at least partial acquisition attempt is unsuccessful, the subscriber station to resume operating in the current mode of operation using the stored state information.

12. The method of claim 11 wherein the estimated location of the subscriber station is determined based on one or more signals received from reference sources.

13. The method of claim 12 wherein at least one of the reference sources comprises a GPS satellite.

14. The method of claim 12 wherein at least one of the reference sources comprises a base station or sector.

15. The method of claim 12 wherein at least one of the reference sources comprises a GPS satellite and another comprises a base station or sector.

16. The method of claim 11 wherein the attempting step comprises correlating a received signal with an identification code uniquely identifying a candidate system, resulting in a correlation function having a peak, and determining if the peak of the correlation function exceeds a predetermined threshold.

17. The method of claim 11 further comprising determining when the subscriber station is scheduled to transition to the active state in the current mode of operation, and, responsive thereto, determining one or more parameters of the at least partial acquisition.

18. The method of claim 17 wherein the one or more parameters comprise coherent integration time.

19. The method of claim 17 wherein the one or more parameters comprise non-coherent integration time.

20. The method of claim 17 wherein the one or more parameters comprise coherent and incoherent integration times.

21. The method of claim 17 wherein the one or more parameters comprise one or more energy levels.

* * * * *